United States Patent
Vanni et al.

(10) Patent No.: US 10,451,158 B2
(45) Date of Patent: Oct. 22, 2019

(54) TORQUE CONVERTER CONFIGURED FOR CROSS-FLOW TO PRESSURE CHAMBERS

(71) Applicant: Schaeffler Technologies AG & Co. KG, Herzogenaurach (DE)

(72) Inventors: Jeremy Vanni, Wooster, OH (US); Drew Hilty, Wooster, OH (US); Justin Clark, Ravenna, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 91 days.

(21) Appl. No.: 15/803,911

(22) Filed: Nov. 6, 2017

(65) Prior Publication Data

US 2019/0136951 A1    May 9, 2019

(51) Int. Cl.
*F16H 45/02*    (2006.01)

(52) U.S. Cl.
CPC ....... *F16H 45/02* (2013.01); *F16H 2045/021* (2013.01); *F16H 2045/0215* (2013.01); *F16H 2045/0226* (2013.01); *F16H 2045/0263* (2013.01)

(58) Field of Classification Search
CPC ............. F16H 45/02; F16H 2045/0215; F16H 2045/0226; F16H 2045/0263
See application file for complete search history.

(56) References Cited

U.S. PATENT DOCUMENTS

| 7,028,820 | B2 * | 4/2006 | Johann | F16H 45/02 |
| | | | | 192/3.26 |
| 7,036,643 | B2 * | 5/2006 | Back | F16H 45/02 |
| | | | | 192/3.3 |
| 7,644,812 | B2 * | 1/2010 | Simpson | F16H 61/62 |
| | | | | 192/3.26 |
| 7,891,473 | B2 * | 2/2011 | Maienschein | F16H 45/02 |
| | | | | 192/113.34 |
| 8,708,116 | B2 * | 4/2014 | Miyahara | F16F 15/145 |
| | | | | 192/3.29 |
| 8,863,923 | B2 * | 10/2014 | Kaneko | F16H 45/02 |
| | | | | 192/110 B |
| 8,919,509 | B2 * | 12/2014 | Maienschein | F16H 45/02 |
| | | | | 192/113.34 |
| 9,188,212 | B2 | 11/2015 | Vanni et al. | |
| 2006/0124420 | A1 | 6/2006 | Ackermann | |
| 2007/0068759 | A1 * | 3/2007 | Koppitz | F16H 45/02 |
| | | | | 192/3.3 |
| 2008/0173512 | A1 | 7/2008 | Kaneko et al. | |
| 2009/0223767 | A1 | 9/2009 | Arhab et al. | |

(Continued)

*Primary Examiner* — Tinh T Dang

(57) ABSTRACT

A torque converter, including: a cover; a lock-up clutch with a piston plate; an output hub; a first hub including a through-bore; a chamber bounded by the turbine; an apply chamber bounded by the piston plate; a release chamber bounded by the cover, the first hub, and the piston plate; a first flow path; a through-bore through the first hub; and a second flow path. The second flow path: is sealed from the first chamber; passes through the through-bore; and includes a portion circumferentially aligned with the first flow path. A line in an axial direction passes through the through-bore without intersecting the first hub. For a lock-up mode, pressurized fluid in the apply chamber displaces the piston plate in a first axial direction. For a torque converter mode, pressurized fluid in the release chamber displaces the piston plate in a second axial direction.

20 Claims, 5 Drawing Sheets

(56) References Cited

U.S. PATENT DOCUMENTS

2016/0017971 A1   1/2016  Sayre et al.
2017/0002908 A1*  1/2017  Saka ...................... F16H 45/02
2017/0023116 A1   1/2017  Jewell

* cited by examiner

US 10,451,158 B2

TORQUE CONVERTER CONFIGURED FOR CROSS-FLOW TO PRESSURE CHAMBERS

TECHNICAL FIELD

The present disclosure relates to a torque converter configured with circumferentially overlapping pressurized flow paths for apply and release pressure chambers.

BACKGROUND

Cross-flow hubs in torque converters are known. One such example is described in commonly-owned U.S. Patent Application Publication No. 2017/0023116-A1, published Jan. 26, 2017.

SUMMARY

According to aspects illustrated herein, there is provided a torque converter, including: an axis of rotation; a cover arranged to receive torque; an impeller; a turbine; a lock-up clutch including a piston plate; an output hub connected to the turbine and arranged to non-rotatably connect to a transmission input shaft; a first hub connected to the cover: a through-bore bounded in first and second opposite radial directions by the first hub; a first chamber bounded at least in part by the turbine; an apply chamber bounded at least in part by the piston plate; a release chamber bounded at least in part by the cover, the first hub, and the piston plate; a first flow path; a second flow path sealed from the first chamber and including the through-bore and a portion circumferentially aligned with the first flow path. A line in a first axial direction passes through an entirety of the through-bore without intersecting the first hub. For a lock-up mode for the torque converter, in which the piston plate is non-rotatably connected to the cover, first pressurized fluid is arranged to flow through the first flow path into the apply chamber and displace the piston plate in the first axial direction. For a torque converter mode for the torque converter, in which the cover is rotatable with respect to the piston plate, second pressurized fluid is arranged to flow through the second flow path into the release chamber and displace the piston plate in a second axial direction, opposite the first axial direction, to disconnect the piston plate from the cover.

According to aspects illustrated herein, there is provided a torque converter, including: an axis of rotation; a cover arranged to receive torque; an impeller; a turbine; a flow-plate non-rotatably connected to the cover; a through-bore through the flow plate; a lock-up clutch including a piston plate; an output hub non-rotatably connected to the turbine and arranged to non-rotatably connect to a transmission input shaft; a first chamber including the impeller; an apply chamber bounded at least in part by the piston plate; a release chamber bounded at least in part by the cover and the piston plate; a first flow path including a first radially innermost end bounded in a first axial direction by the flow plate; and a second flow path sealed from the first chamber and including a second radially innermost end bounded in a first and second opposite radial directions by the output hub and the flow plate, respectively and located further in the first axial direction, than the first radially innermost end. The first axial direction is parallel to the axis of rotation and from the turbine toward the impeller. A line in the first axial direction passes through the through-bore without intersecting the flow plate. For a lock-up mode, first pressurized fluid is arranged to flow through the first radially innermost end and the first flow path into the apply chamber to displace the piston plate in a second axial direction, opposite the first axial direction, and non-rotatably connect the cover and the piston plate. For a torque converter mode, second pressurized fluid is arranged to flow through the second flow path to displace the piston plate in the first axial direction to disconnect the piston plate from the cover.

According to aspects illustrated herein, there is provided a torque converter, including: a cover arranged to receive torque; an impeller; a turbine; a lock-up clutch including a piston plate; a first hub fixedly connected to the cover; a through-bore through the first hub; an output hub non-rotatably connected to the turbine and arranged to non-rotatably connect to an input shaft for a transmission; a first chamber including the turbine; an apply chamber bounded at least in part by the piston plate; a release chamber bounded at least in part by the cover, the first hub, and the piston plate; a first flow path including an first entry point for the first flow path into the torque converter, the first entry point bounded in part by the first hub; a second flow path passing through the through-bore and including a second entry point for the second fluid path into the torque converter, the second entry point bounded in part by the output hub and located further in a first axial direction than the first entry point. A line in the first axial direction passes through an entirety of the through-bore without intersecting the first hub. The second flow path is sealed from the first chamber. The first axial direction is from the turbine toward the impeller. For a lock-up mode, first pressurized fluid is arranged to flow through the first entry point and the first flow path into the apply chamber to displace the piston plate in a second axial direction, opposite the first axial direction, and non-rotatably connect the cover and the piston plate. For a torque converter mode, second pressurized fluid is arranged to flow through the second entry point and the second flow path into the release chamber to displace the piston plate in the first axial direction and disconnect the piston plate from the cover.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 5:
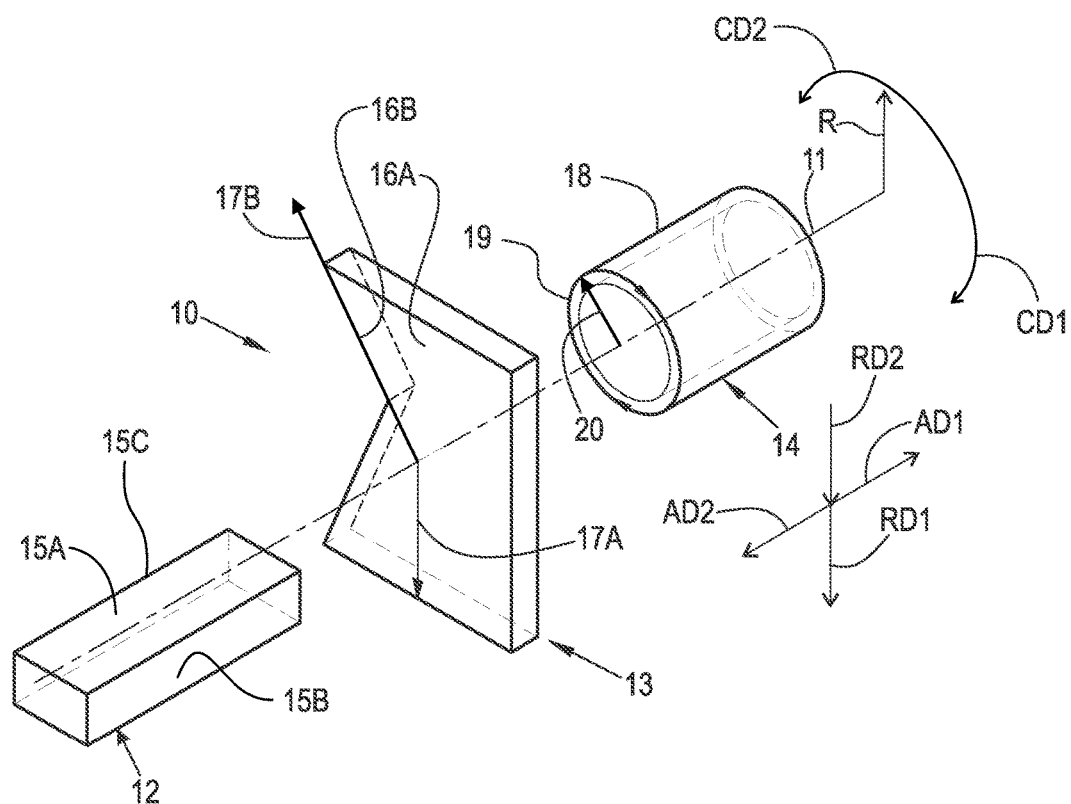

FIG. 5 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
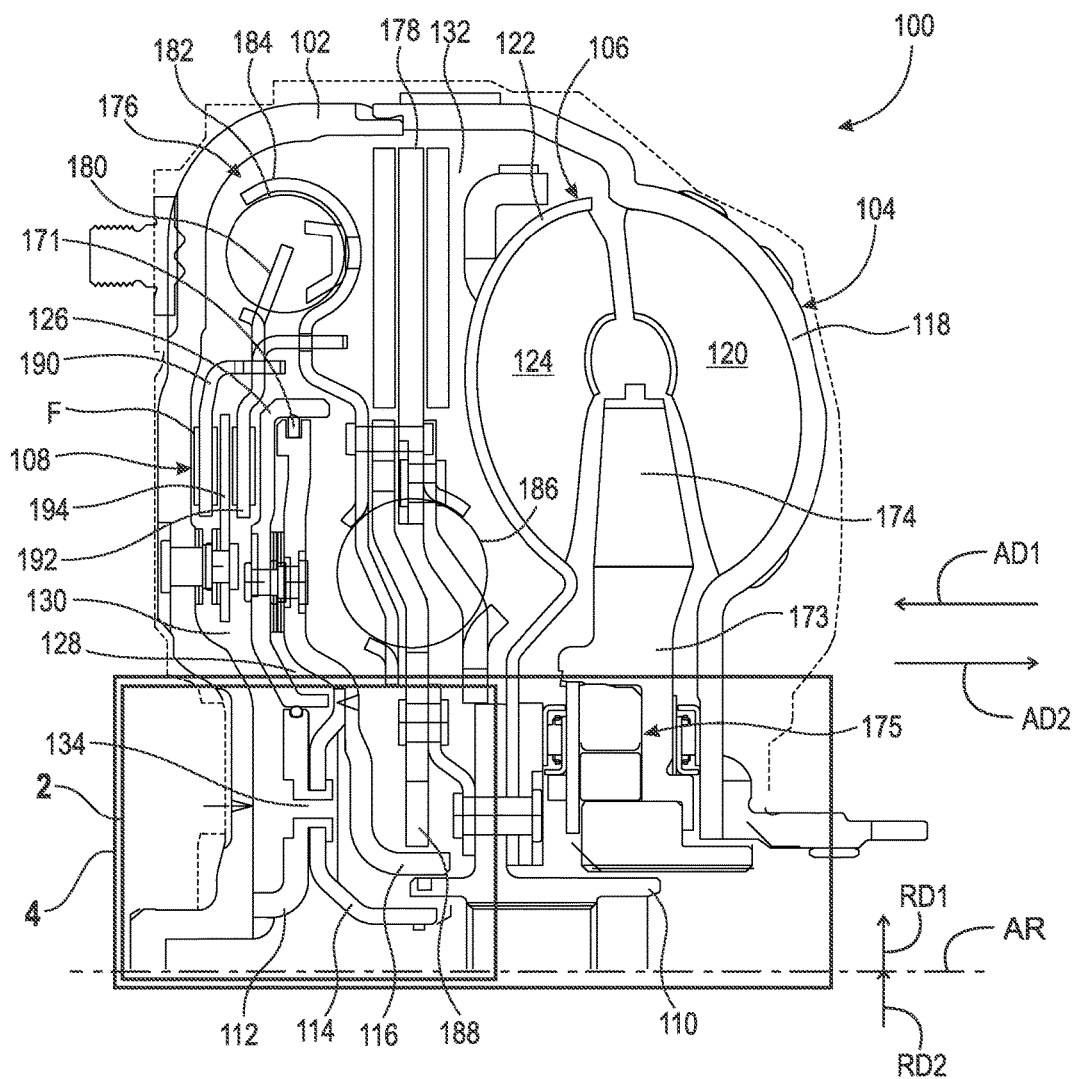
FIG. 1 is a partial cross-sectional view of a torque converter configured for cross flow to pressure chambers.

FIG. 1 is a partial cross-sectional view of torque converter 100 configured for cross flow to pressure chambers.

Figure 2:
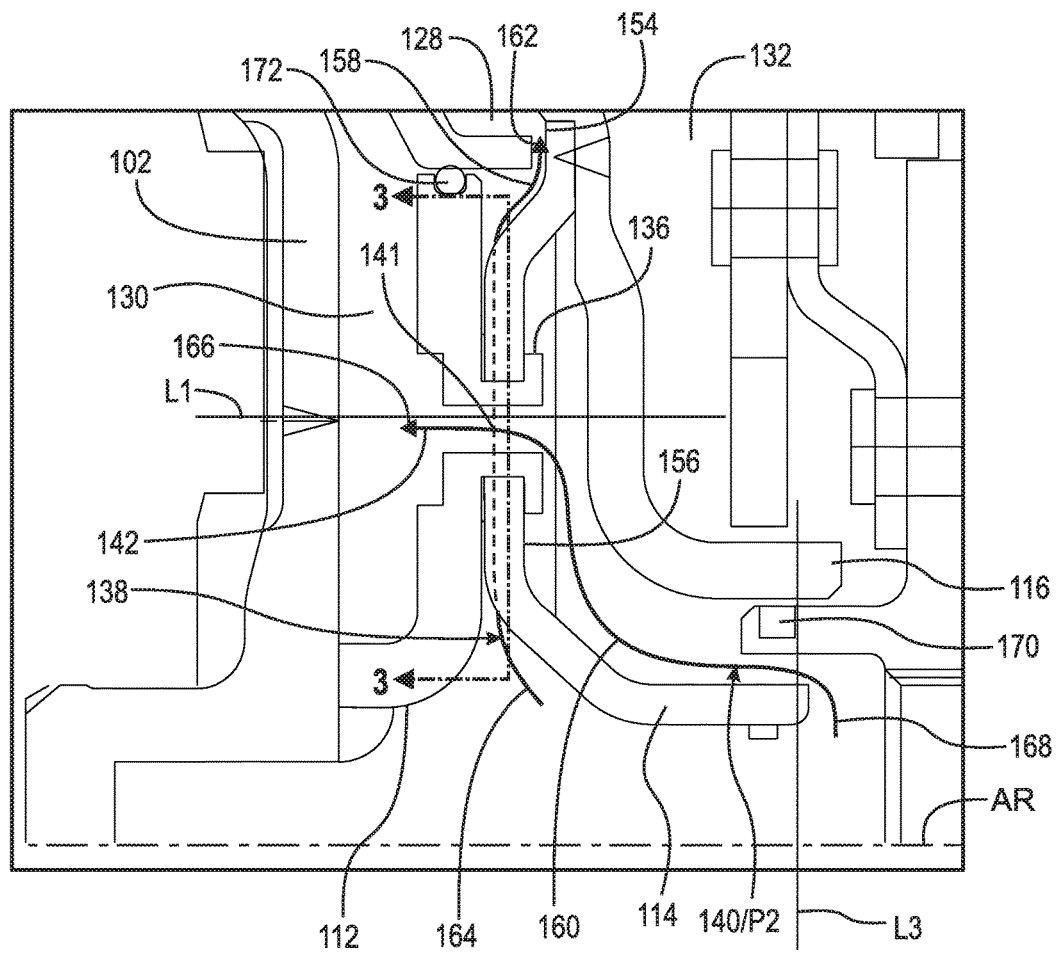
FIG. 2 is a detail of area 2 in FIG. 1.

FIG. 2 is a detail of area 2 in FIG. 1. The following should be viewed in light of FIGS. 1 and 2. Torque converter 100 includes: axis of rotation AR; cover 102 arranged to receive torque; impeller 104; turbine 106; lock up clutch 108; output hub 110; hub 112 non-rotatably connected to cover 102; flow plate 114; and backing plate 116. Impeller 104 includes: impeller shell 118 non-rotatably connected to cover 102; and at least one impeller blade 120. Turbine 106 includes: turbine shell 122 non-rotatably connected to hub 110; and at least one turbine blade 124. Lock-up clutch 108 includes piston plate 126. Torque converter 100 includes: apply chamber 128; release chamber 130; and chamber 132. By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Flow plate 114 is non-rotatably connected to: hub 112; and plate 116. Chamber 128 is bounded, at least in part, by plate 116 and plate 126. Chamber 130 is bounded, at least in part, by cover 102, hub 112, and plate 126. Chamber 132 is bounded, at least in part, by plate 116 and shell 122. By "bounded in part," we mean that a portion of the cited chamber, flow path, or other structure is bounded, or formed, by the cited element.

Hub 112 includes through-bore 134 bounded in opposite radial directions RD1 and RD2, orthogonal to axis AR, by hub 112. In an example embodiment: hub 112 includes extruded rivet 136; and through-bore 134 passes through rivet 136. Torque converter 100 includes flow path 138 and flow path 140. Flow path 140 is sealed from flow path 138 and includes, that is, passes through, through-bore 134. That is, flow path 140 includes through-bore 134. Flow path 138 does not pass through through-bore 134. Portion 141 of flow path 140 is circumferentially aligned with flow path 138. In an example embodiment, line L1, in axial direction AD1 parallel to axis AR, passes through the entirety of through-bore 134 without intersecting hub 112. Torque converter 100 includes: entry point 142 for flow path 138 into converter 100; and entry point 143 for flow path 140 into converter 100.

Figure 3:
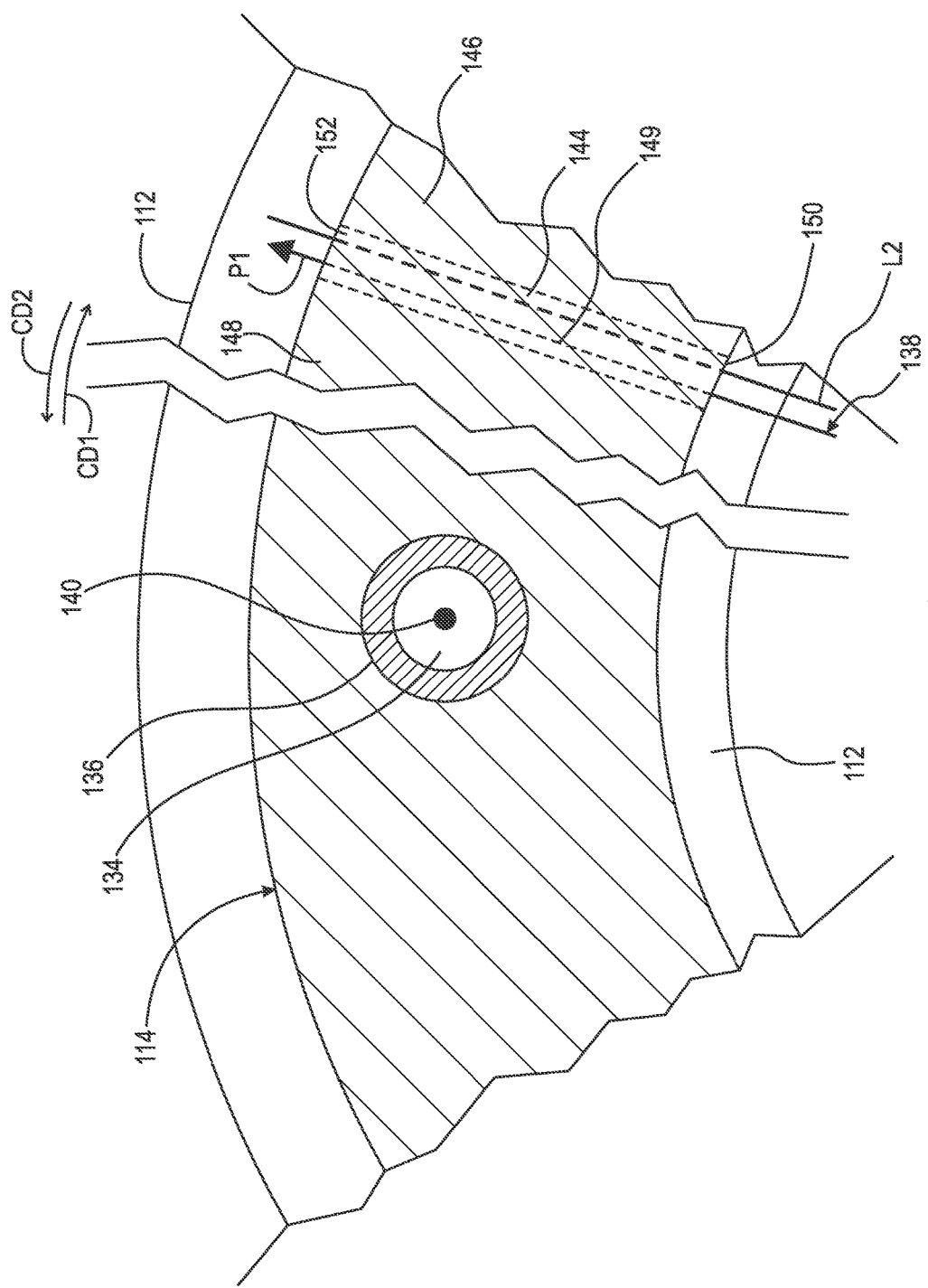
FIG. 3 is a cross-sectional view generally along line 3-3 in FIG. 2.

FIG. 3 is a cross-sectional view generally along line 3-3 in FIG. 2. The following should be viewed in light of FIGS. 1 through 3. Flow plate 114 includes at least one groove 144. Groove 144 is bounded, in opposite circumferential directions CD1 and CD2, by portions 146 and 148, respectively, of plate 114 sealed against, for example in contact with, hub 112. Portion 149 of flow path 138 passes through groove 144. That is, flow path 138 includes groove 144. Groove 144 is bounded by hub 112 in direction AD1 and includes openings 150 and 152 opening radially inwardly and radially outwardly, respectively. Flow plate 114 includes: surface 154 facing in direction AD1 and bounding, in part, flow path 138; and surface 156, facing in direction AD2 and bounding, in part, flow path 140. In an example embodiment, line L2, in radial direction RD1, passes through the entirety of groove 144 without intersecting hub 112 or plate 114.

For a lock-up mode for torque converter 100, in which piston plate 126 is non-rotatably connected to cover 102 and the torque is transmitted to hub 110 through clutch 108, Pressurized fluid P1 is arranged to flow through flow path 138 into apply chamber 128 and displace piston plate in axial direction AD1. For a torque converter mode for torque converter 100, in which cover 102 is rotatable with respect to piston plate 126 and the torque bypasses clutch 108, pressurized fluid P2 is arranged to flow through flow path 140 into release chamber 130 and displace piston plate 126 in axial direction AD2, opposite direction AD1, to disconnect piston plate 126 from cover 102.

Flow plate 114 bounds, in part, flow paths 138 and 140. For example, flow plate 114 bounds portions 158 and 160 of flow paths 138 and 140, respectively. Flow path 138 includes: end 162 open to apply chamber 128; and end 164 radially inward of end 162 and bounded in part by plate 114. Flow path 140 includes: end 166 open to release chamber 130; and end 168 radially inward of end 166 and bounded in part by plate 114. In an example embodiment, end 164 is bounded in axial directions AD1 and AD2 by hub 112 and flow plate 114, respectively. In an example embodiment, end 168 is radially disposed between backing plate 116 and flow plate 114. In an example embodiment, end 168 is bounded radially inwardly in direction RD2 by flow plate 114 and is bounded radially outwardly in direction RD1 by output hub 110.

In an example embodiment, torque converter 100 includes seal 170 sealing hub 110 against plate 116. Seal 170 seals flow path 140 from chamber 132. Line L3, orthogonal to axis AR passes through in sequence: axis of rotation AR; flow plate 114; end 168; output hub 110; and backing plate 116. In an example embodiment, torque converter 100 includes seals 171 and 172. Seal 171 seals piston plate 126 against backing plate 116. Seal 172 seals hub 112 against piston plate 126.

In an example embodiment, torque converter 100 includes: stator 173 with at least one stator blade 174; one-way clutch 175; torsional vibration damper 176; and pendulum vibration absorber 178. Damper 176 includes input plate 180, at least one spring 182, spring retainer plate 184, at least one spring 186, and output flange 188. Spring 182 is engaged with plates 180 and 184. Spring 186 is engaged with plate 184 and flange 188. Absorber 178 is connected to plate 184 and flange 188 is non-rotatably connected to hub 110.

In an example embodiment, clutch 108 includes clutch plates 190, 192 and 194 axially disposed between cover 102 and piston plate 126. Plates 190 and 192 are non-rotatably connected to plate 180 and connected to spring 182. Plate 194 is non-rotatably connected to cover 102. Respective friction material F is disposed between: cover 102, plates 190, 192 and 194; and piston plate 116.

Figure 4:
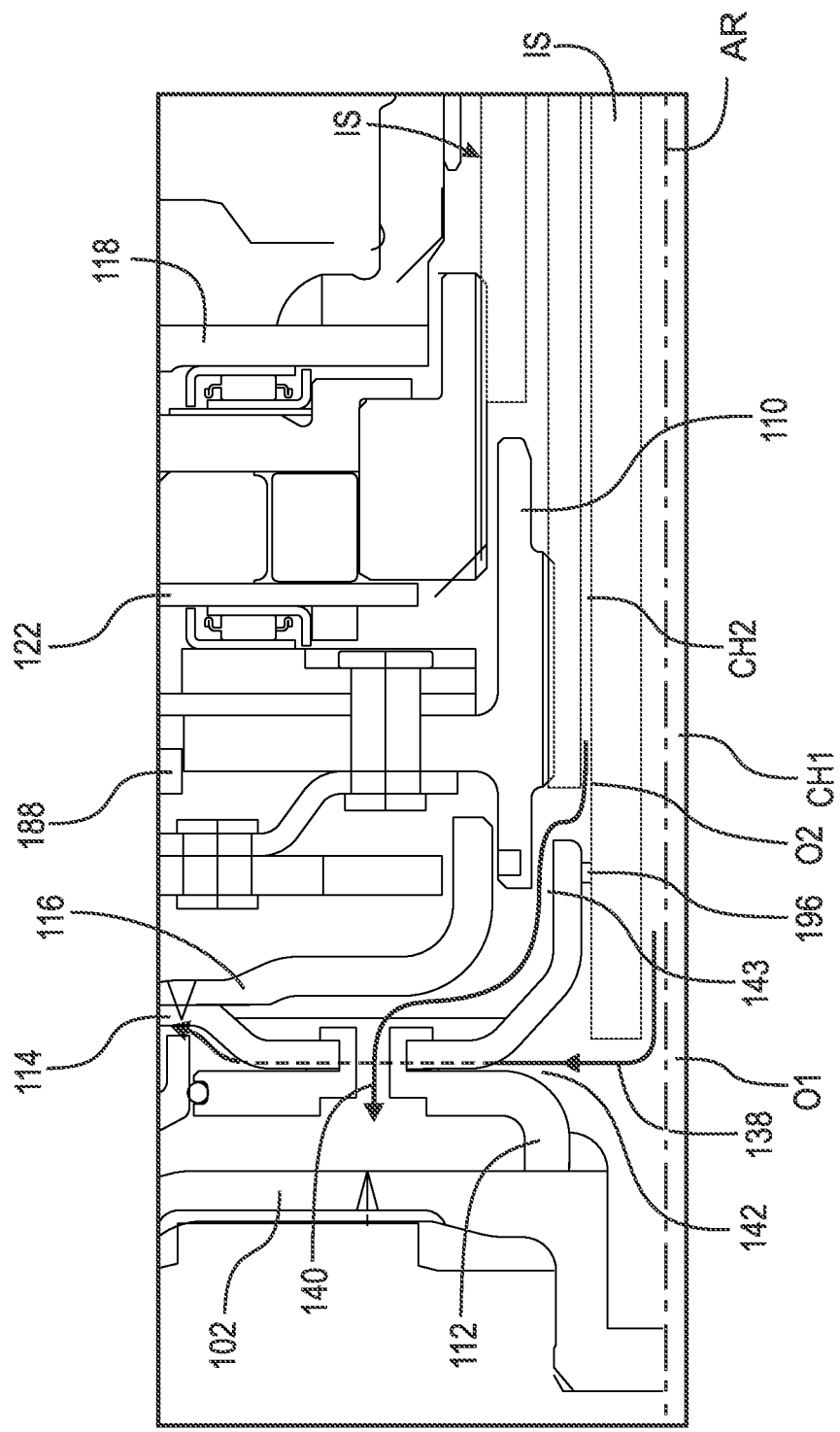
FIG. 4 is detail of area 4 of FIG. 1 with a transmission input shaft added; and, FIG. 5 is a perspective view of a cylindrical coordinate system demonstrating spatial terminology used in the present application.

FIG. 4 is detail of area 4 of FIG. 1 with transmission input shaft IS added. In FIG. 4, output hub 110 is non-rotatably connected to shaft IS. Seal 196 seals plate 114 against shaft IS and seals flow path 138 from flow path 140. Shaft IS includes channels CH1 and CH2. Channel CH1 supplies pressurized fluid to apply chamber 128. Thus, flow path 138 flows through channel CH1. Channel CH2 supplies pressurized fluid to release chamber 130. Thus, flow path 140 flows through channel CH2. Channel CH1 extends further in direction AD1 than channel CH2, resulting in an axial orientation of channels CH1 and CH2 opposite of the axial orientation for apply chamber 128 and release chamber 130. However, the configuration of torque converter 100 enables flow path 138 to cross flow path 140 in axial direction AD1 and overlap flow path 140 in circumferential directions CD1 and CD2, enabling the use of shaft IS with torque converter 100. Entry point 142 opens to opening O1 for channel CH1. Entry point 143 opens to opening O2 for channel CH2.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
AR axis of rotation
CH1 channel
CH2 channel
F friction material
L1 line
L2 line
L3 line
O1 opening
O2 opening
100 torque converter
102 cover
104 impeller
106 turbine
108 lock up clutch
110 output hub
112 hub
114 flow plate
116 backing plate
118 impeller shell
120 impeller blade
122 turbine shell
124 turbine blade
126 piston plate
128 apply chamber
130 release chamber
132 chamber
134 through-bore
136 rivet
138 flow path
140 flow path
142 entry point
143 entry point
144 groove
146 portion, plate 114
148 portion, plate 114
149 portion, path 138
150 opening, groove 144
152 opening, groove 144
154 surface, plate 114
156 surface, plate 114
158 portion, path 138
160 portion, path 140
162 end, path 138
164 end, path 138
166 end, path 140
168 end, path 140
170 seal
171 seal
172 seal
173 stator
174 stator blade
176 torsional vibration damper
178 pendulum vibration absorber
180 input plate, damper 176
182 spring
184 spring retainer plate
186 spring 188 output flange
190 clutch plate
192 clutch plate
194 clutch plate

The invention claimed is:

1. A torque converter; comprising:
an axis of rotation;
a cover arranged to receive torque;
an impeller;
a turbine;
a lock-up clutch including a piston plate;
an output hub connected to the turbine and arranged to non-rotatably connect to a transmission input shaft;
a first hub connected to the cover:
a through-bore bounded in first and second opposite radial directions by the first hub;
a first chamber bounded at least in part by the turbine;
an apply chamber bounded at least in part by the piston plate;
a release chamber bounded at least in part by the cover, the first hub, and the piston plate;
a first flow path;
a second flow path sealed from the first chamber:
passing through the through-bore; and,
including a portion circumferentially aligned with the first flow path, wherein:
a line in a first axial direction passes through an entirety of the through-bore without intersecting the first hub;
for a lock-up mode for the torque converter, in which the piston plate is non-rotatably connected to the cover, first pressurized fluid is arranged to flow through the first flow path into the apply chamber and displace the piston plate in the first axial direction; and,
for a torque converter mode for the torque converter, in which the cover is rotatable with respect to the piston plate, second pressurized fluid is arranged to flow through the second flow path into the release chamber and displace the piston plate in a second axial direction, opposite the first axial direction, to disconnect the piston plate from the cover.

2. The torque converter of claim 1, further comprising:
a flow plate non-rotatably connected to the first hub, wherein:
the flow plate bounds, in part, the first flow path and the second flow path; and,
the through-bore passes through the flow plate.

3. The torque converter of claim 2, wherein:
the flow plate includes:
a first surface facing in the first axial direction and bounding, in part, the first flow path; and,
a second surface facing in the second axial direction and bounding, in part, the second flow path.

4. The torque converter of claim 2, further comprising:
a groove:
bounded in the first axial direction by the first hub; and,
bounded in the second axial direction by the flow plate, wherein the first flow path passes through the groove.

5. The torque converter of claim 4, wherein a line, orthogonal to the axis of rotation, passes through an entirety of the groove without intersecting the first hub or the flow plate.

6. The torque converter of claim 1, further comprising:
a flow plate non-rotatably connected to the first hub, wherein:
the first axial direction is from the impeller toward the turbine;
the first flow path includes:
a first end open to the apply chamber; and,
a second end:
at an inner circumference of the torque converter;
radially inward of the first end; and,
bounded in part by the flow plate;
the second flow path includes:
a third end open to the release chamber; and,
a fourth end:
at the inner circumference;
radially inward of the third end; and,
bounded by the output hub and the flow plate; and,
the second end is located further in the first axial direction than the fourth end.

7. The torque converter of claim 6, further comprising:
a backing plate non-rotatably connected to the cover and bounding, in part, the apply chamber, wherein:
the second end is bounded in the first and second axial directions by the hub and the flow plate, respectively; and,
the fourth end is radially disposed between the backing plate and the plate.

8. The torque converter of claim 6, wherein the fourth end is bounded:
in a radially outward direction by the output hub; and,
in a radially inward direction by the flow plate.

9. The torque converter of claim 6, further comprising:
a backing plate non-rotatably connected to the cover and bounding, in part, the apply chamber; and,
a seal:
in contact with the backing plate and the output hub; and,
sealing the second flow path from the first chamber.

10. The torque converter of claim 6, further comprising:
a backing plate non-rotatably connected to the cover, wherein a line orthogonal to the axis of rotation passes through in sequence: the axis of rotation; the flow plate; the fourth end; the output hub; and the backing plate.

11. The torque converter of claim 1, further comprising:
a turbine shell non-rotatably connected to the output hub, wherein the first hub is non-rotatably connected to the cover.

12. A torque converter, comprising:
an axis of rotation;
a cover arranged to receive torque;
an impeller including an impeller shell;
a turbine;
a flow plate non-rotatably connected to the cover;
a through-bore through the flow plate;
a lock-up clutch including a piston plate;
an output hub non-rotatably connected to the turbine and arranged to non-rotatably connect to a transmission input shaft;
a first chamber bounded at least in part by the impeller shell;
an apply chamber bounded at least in part by the piston plate;
a release chamber bounded at least in part by the cover and the piston plate;
a first flow path including a first radially innermost end bounded in a first axial direction by the flow plate; and,
a second flow path:
sealed from the first chamber; and,
including a second radially innermost end:
bounded in first and second opposite radial directions by the output hub and the flow plate, respectively; and, located further in the first axial direction, than the first radially innermost end, wherein:
the first axial direction is parallel to the axis of rotation and from the turbine toward the impeller;
a line in the first axial direction passes through the through-bore without intersecting the flow plate;
for a lock-up mode, first pressurized fluid is arranged to flow through the first radially, innermost end and the first flow path into the apply chamber to displace the piston plate in a second axial direction, opposite the first axial direction, and non-rotatably connect the cover and the piston plate; and,
for a torque converter mode, second pressurized fluid is arranged to flow through the second flow path to displace the piston plate in the first axial direction, to disconnect the piston plate from the cover.

13. The torque converter of claim 12, further comprising:
a first hub non-rotatably connected to the cover and the flow plate, wherein:
the through-bore passes through the first hub; and,
the line does not intersect the first hub.

14. The torque converter of claim 12, further comprising:
a backing plate non-rotatably connected to the flow plate and bounding a portion of the apply chamber, wherein:
the second radially innermost end is radially disposed between the backing plate and the flow plate; and,
the line passes through the backing plate.

15. The torque converter of claim 14, further comprising a seal:
in contact with the backing plate and the output hub; and,
sealing the second flow path from the first chamber.

16. The torque converter of claim 12, further comprising:
a first hub non-rotatably connected to the cover and the flow plate, wherein:
the flow plate includes:
    a first portion and a second portion, each in contact with the first hub; and,
    a groove bounded in first and second opposite circumferential directions by the first portion and the second portion, respectively;
the first flow path passes through the groove; and,
a line, orthogonal to the axis of rotation, passes through an entirety of the groove without intersecting the first hub or the flow plate.

17. A torque converter, comprising:
a cover arranged to receive torque;
an impeller;
a turbine;
a lock-up clutch including a piston plate;
a first hub fixedly connected to the cover;
a through-bore through the first hub;
an output hub non-rotatably connected to the turbine and arranged to non-rotatably connect to an input shaft for a transmission;
a first chamber bounded at least in part by the turbine;
an apply chamber bounded at least in part by the piston plate;
a release chamber bounded at least in part by the cover, the first hub, and the piston plate;
a first flow path including a first end:
    at an inner circumference of the torque converter; and,
    bounded in part by the first hub;
a second flow path passing through the through-bore and including a second end:
    at the inner circumference:
    bounded in part by the output hub; and,
    located further in a first axial direction than the first end, wherein:
a line in the first axial direction passes through an entirety of the through-bore without intersecting the first hub;
the second flow path is sealed from the first chamber;
the first axial direction is from the turbine toward the impeller;
for a lock-up mode, first pressurized fluid is arranged to flow through the first end into the apply chamber to displace the piston plate in a second axial direction, opposite the first axial direction, and non-rotatably connect the cover and the piston plate; and,
for a torque converter mode; second pressurized fluid is arranged to flow through the second end into the release chamber to displace the piston plate in the first axial direction and disconnect the piston plate from the cover.

18. The torque converter of claim 17, further comprising:
a backing plate non-rotatably connected to the cover and bounding in part the apply chamber; and,
a flow plate non-rotatably connected to the backing plate, wherein:
the second end is radially disposed between the flow plate and the backing plate; and,
the line passes through the backing plate.

19. The torque converter of claim 18, further comprising:
a flow plate bounding in part the first flow path and the second flow path;
a groove:
bounded in the first axial direction by the flow plate; and,
bounded in the second axial direction by the first hub, wherein:
    the first flow path passes through the groove; and,
    a line orthogonal to an axis of rotation of the torque converter passes through the groove without intersecting the first hub or the flow plate.

20. The torque converter of claim 18, wherein:
the first end is bounded in the first and second axial directions by the flow plate and the first hub, respectively; and,
the second end is bounded in:
a radially outward direction by the output hub; and,
a radially inward direction by the flow plate.

* * * * *

UNITED STATES PATENT AND TRADEMARK OFFICE
CERTIFICATE OF CORRECTION

PATENT NO. : 10,451,158 B2
APPLICATION NO. : 15/803911
DATED : October 22, 2019
INVENTOR(S) : Vanni et al.

It is certified that error appears in the above-identified patent and that said Letters Patent is hereby corrected as shown below:

In the Claims

Column 8, Line 22, "plate and the plate" should read --plate and the flow plate--

Column 9, Line 8, "flow through the first radially, innermost end and the" should read --flow through the first radially innermost end and the--

Signed and Sealed this
Thirty-first Day of December, 2019

Andrei Iancu
*Director of the United States Patent and Trademark Office*